United States Patent [19]

Boeckh et al.

[11] Patent Number: 5,488,095

[45] Date of Patent: Jan. 30, 1996

[54] CONDENSATION PRODUCTS THAT CONTAIN N,O-ACETAL OR CARBOXAMIDE STRUCTURES, PREPARATION THEREOF, USE THEREOF, AND CONDENSATION PRODUCTS THAT CONTAIN ACETAL-LACTONE STRUCTURES

[75] Inventors: Dieter Boeckh, Limburgerhof; Angelika Funhof, Heidelberg; Matthias Kroner, Eisenberg; Heinrich Hartmann, Limburgerhof; Richard Baur, Mutterstadt; Alexander Kud, Eppelsheim; Volker Schwendemann, Neustadt, all of Germany

[73] Assignee: BASF Aktiengesellschaft, Ludwigshafen, Germany

[21] Appl. No.: 367,230

[22] Filed: Jan. 18, 1995

[30] Foreign Application Priority Data

Jul. 20, 1992 [DE] Germany .................. 42 23 807.2

[51] Int. Cl.$^6$ .................. C08G 63/06; C08G 12/00
[52] U.S. Cl. .................. 528/361; 252/89.1; 528/129; 220/229; 220/230; 220/354
[58] Field of Search .................. 252/89.1; 528/129, 528/220, 229, 230, 354, 361

[56] References Cited

U.S. PATENT DOCUMENTS 3,763,189  2/1973  Harken .
3,989,637  2/1976  Hogue et al. .

FOREIGN PATENT DOCUMENTS 280223  2/1988  European Pat. Off. .

OTHER PUBLICATIONS

Chem. Zentralblatt vol. 73, p. 300, (1902).
J. Chem. Soc., vol. 125, p. 1943, (1924).
Ber. Dt. Chem. Ges., vol. 60, p. 488 (1927).

*Primary Examiner*—Shelley A. Dodson
*Attorney, Agent, or Firm*—Oblon, Spivak, McClelland, Maier & Neustadt

[57] ABSTRACT

Condensation products that contain N,O-acetal or carboxamide structures and are useful as detergent and cleaner additives are obtainable by condensation of (a) compounds that contain at least one unit of the structural elements

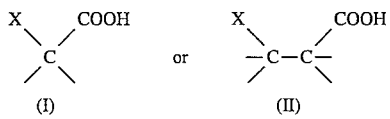

where X is OH or NHR and R is $C_1$–$C_6$-alkyl or —$CH_2$—COOH, with (b) aldehydes, ketones or aldehyde- or keto-carboxylic acids to form acetal-lactones, and subsequent cleavage of the acetal-lactones with (c) aminocarboxylic acids, primary or secondary amines and/or polyethyleneimines.

7 Claims, No Drawings

CONDENSATION PRODUCTS THAT CONTAIN N,O-ACETAL OR CARBOXAMIDE STRUCTURES, PREPARATION THEREOF, USE THEREOF, AND CONDENSATION PRODUCTS THAT CONTAIN ACETAL-LACTONE STRUCTURES

The present invention relates to condensation products that contain N,O-acetal or carboxamide structures and are obtainable by cleavage of acetal- or ketal-lactones with aminocarboxylic acids, primary or secondary amines and/or polyethyleneimines, processes for preparing them by reacting compounds that contain at least one acetal- or ketal-lactone group with aminocarboxylic acids, primary or secondary amines and/or poly-ethyleneimines, and the use of the condensation products with N,O-acetal or carboxamide structures thus obtainable as reduced-phosphate and phosphate-free detergent and cleaner additive. The present invention also relates to condensation products that contain acetal- or ketal-lactone structures and are obtainable by reacting polyesters of hydroxycarboxylic acids or secondary aminocarboxylic acids and polyhydroxy compounds with aldehydes, ketones or aldehyde- or keto-carboxylic acids. The present invention further relates to condensation products that contain acetal-lactone structures and are obtainable by reacting hydroxycarboxylic acids or secondary aminocarboxylic acids with glyoxal.

Acetal-lactones have been known for a long time. For instance, the condensation product of formaldehyde with citric acid is described as a cyclic acetal-lactone in Chem. Zentralblatt 73 (1902), 300. Corresponding bisacetal-lactones of tartaric acid are known from J. Chem. Soc. 125 (1924), 1943, and Ber. Dt. Chem. Gee. 60 (1927), 488. EP-B-0 280 223 discloses polycondensates of polyol carboxylic acids and dialdehydes and describes them as polyacetals. U.S. Pat. No. 3,763,189 discloses the cyclic acetal-lactone formed from citric acid and glyoxylic acid.

U.S. Pat. No. 3,989,637 discloses the use of acetal-lactones as corrosion inhibitor. Acetal-lactones can be prepared for example by reacting hydroxycarboxylic acids such as citric acid with formaldehyde or formaldehyde donors or glyoxylic acid.

It is an object of the present invention to provide novel substances.

We have found that this object is achieved by condensation products that contain N,O-acetal or carboxamide structures, obtainable by condensation of (a) compounds that contain at least one unit of the structural element

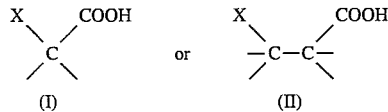

where X is OH or NHR and R is $C_1$–$C_6$-alkyl or —$(CH_2)_n$—COOH and are derived from hydroxcarboxylic acids, secondary amino acids, poly-$\alpha$-hydroxyacrylic acid, poly-$\alpha$-hydroxymaleic acid, hydrolyzed copolymers formed from vinyl esters with monoethylenically unsaturated mono- or dicarboxylic acids or esterification products formed from polybasic hydroxycarboxylic acids with polyhydroxy compounds, with n=1–4, with (b) aldehydes, ketones or aldehyde- or keto-carboxylic acids to form acetal-lactones, and subsequent cleavage of the acetal-lactones or ketal-lactones with (c) aminocarboxylic acids, primary or secondary amines and/or polyethyleneimines.

The condensation products are used as reduced-phosphate and phosphate-free detergent and cleaner additive.

We have found that the object is also achieved by condensation products that contain acetal-lactone or ketal-lactone structures, obtainable by condensation of (a) hydroxycarboxylic acids or secondary aminocarboxylic acids with polyhydroxy compounds to give condensation products having a K value of from 8 to 100 (determined by the method of H. Fikentscher on a 1% strength by weight aqueous solution of the sodium salt at pH 7 and 25° C.) and reaction of the condensation products with (b) aldehydes, ketones or aldehyde- or keto-carboxylic acids.

We have found that the object is also achieved by condensation products that contain acetal-lactone structures, obtainable by condensation of a) hydroxycarboxylic acids or secondary aminocarboxylic acids, with b) glyoxal.

Compounds of group (a) that contain at least one unit of the structural element

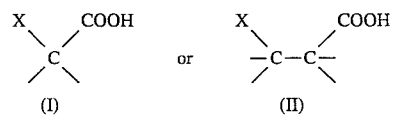

where X is either OH or NHR and R is a $C_1$–$C_6$-alkyl or —$(CH_2)_n$—(COOH with n=1–4, can be derived from low or high molecular weight compounds.

Low molecular weight compounds of group (a) are for example hydroxycarboxylic acids such as citric acid, malic acid, tartaric acid, isocitric acid, tartronic acid, lactic acid and glycolic acid. Compounds of this kind contain the abovementioned structural units of the formula I. Low molecular weight compounds of group (a) that contain structural elements of the formula I where X=NHR are secondary amino acids such as iminodiacetic acid, N-methylglycine, N-methylaspartic acid, N-methyl-glutamic acid or other N-alkyl-substituted amino acids in which the alkyl substituent may have up to 6 carbon atoms.

Compounds of group (a) that contain structural elements of the formula II are derived from $\beta$-hydroxybutyric acids or N-alkyl-substituted $\beta$-aminocarboxylic acids, eg. $\beta$-hydroxybutyric acid, $\beta$-hydroxyvaleric acid, iminodipropionic acid and N-methyl-$\beta$-alanine.

It is also possible to use step or chain growth polymers that contain structural elements of the formulae I or II. Suitable polymers are for example poly-$\alpha$-hydroxyacrilic acid or poly-$\alpha$-hydroxymaleic acid and also their respective copolymers with other monoethylenically unsaturated monomers, suitable comonomers being for example acrylic acid, methacrylic acid, acrylamide, methacrylamide, acrylonitrile, methacrylonitrile, maleic acid, itaconic acid, N-vinylformamide, vinyl acetate, vinyl propionate and styrene. The appropriate homo- and copolymers that contain at least one unit of the structural elements of the formula I have K values of 8 to 120 (determined by the method of H. Fikentscher on a 1% strength by weight aqueous solution of the sodium salt at pH 7 and 25° C.).

Further suitable polymers for use as compounds of group (a) are hydrolyzed copolymers of vinyl esters with monoethylenically unsaturated mono- or dicarboxylic acids. Copolymers of this type are prepared for example by copolymerizing a vinyl ester such as vinyl acetate or vinyl propionate with a monoethylenically unsaturated carboxylic acid such as acrylic acid or maleic acid or else a mixture of monoethylenically unsaturated carboxylic acids and then hydrolyzing the resulting copolymer to convert the copolymerized vinyl ester units into vinyl alcohol units. Compounds of this type then contain structural elements of the formula II where X=OH.

As well as these polymers it is possible to use esterification products of polybasic hydroxycarboxylic acids with polyhydroxy compounds as described for example in DE-B-1 617 122 or DE-B-2 147 778. These products are essentially citric esters of starch, sorbitol, glycerol, ethylene glycol, polyethylene glycol and of block copolymers of ethylene oxide and propylene oxide. It is also possible to use citric esters of mono-, oligo- and polysaccharides and also citric esters of polyvinyl alcohol. Instead of citric acid it is also possible to use isocitric acid or some other polybasic hydroxycarboxylic acid for preparing suitable compounds of group (a). The citric esters of polyvinyl alcohol and oligo- or polysaccharides are preferably obtained by using an excess of citric or isocitric acid in the esterification, for example an excess of from 1.5 to 20, preferably from 2 to 10, times. After ester formation, the excess acid is separated off. Further suitable compounds of group (a) are polyesters of citric acid or isocitric acid with polyhydroxycarboxylic acids which carry at least 2 OH groups such as tartaric acid, bis-(hydroxymethyl)propionic acid, glucaric acid or gluconic acid. It is also possible to use esterification products of iminodiacetic acid with polyhydroxy compounds such as ethylene glycol, diethylene glycol, polyethylene glycol having average molecular weights of up to 10 000, glycerol, sorbitol, mono-, oligo- or polysaccharides or polyvinyl alcohols.

The various abovementioned polyvinyl alcohols and copolymers that contain copolymerized vinyl alcohol units preferably have average molecular weights of from 1,000 to 80,000. The polyesters contemplated for use as component (a) preferably have K values of from 8 to 100 (determined by the method of H. Fikentscher on a 1% strength by weight aqueous solution of the sodium salt at pH 7 and 25° C.).

The substances that come into consideration for use as compounds (a) contain at least one unit of the structure (I) or (II). Preferred compounds of group (a) are condensation products of citric acid and tartaric acid as described in EP-A-0 483 606 or esterification products of citric acid, malic acid, tartaric acid or iminodiacetic acid with polyhydroxy compounds from glycerol, sorbitol, polyvinyl alcohol and mono-, oligo- or polysaccharides.

Suitable for use as compounds of group (b) are aldehydes, ketones and aldehyde- or keto-carboxylic acids. Suitable aldehydes are for example formaldehyde, acetaldehyde, propionaldehyde, n-butyraldehyde, isobutyr-aldehyde, glyoxal, glutardialdehyde, benzaldehyde and salicylaldehyde. Ketones are for example acetone, methyl ethyl ketone, diethyl ketone and cyclohexanone. The preferred aldehyde carboxylic acid is glyoxylic acid. Suitable ketocarboxylic acids are for example pyruvic acid, mesoxalic acid, oxalacetic acid, ketoglutaric acid and acetonedicarboxylic acid. Of the compounds of group (b), glyoxylic acid, mesoxalic acid, formaldehyde, acetaldehyde and glyoxal are preferred. Formaldehyde can be used in gas form, as a solid in the form of polyform-aldehyde or else in liquid form, namely in the form of trioxane, or in the form of other compounds which form formaldehyde under the reaction conditions.

The acetal-lactones are prepared in a conventional manner by reacting the compounds of group (a) with the compounds of group (b). As mentioned earlier in connection with the background art, most of the low molecular weight acetal-lactones are known, for example the reaction products of citric acid and formaldehyde or of citric acid and glyoxylic acid. The reaction of the compounds mentioned above under (a) and (b) takes place in the presence or in the absence of inert diluents at from 70° to 190° C., preferably at from 90° to 170° C. As diluents it is possible to use for example aliphatic or aromatic hydrocarbons, if desired mixed with aprotic polar solvents such as dioxane, ethylene glycol dimethyl ether or N-methylpyrrolidone. The condensation of the compounds (a) and (b) may if desired be carried out in the presence of acidic catalysts, such as p-toluenesulfonic acid, benzenesulfonic acid or alkylsulfonic acids. However, compounds (a) and (b) can also be reacted—if suitably selected—in the absence of a solvent, in which case the water of reaction is preferably distilled out of the reaction mixture under reduced pressure. Acetal-lactone polycondensates of glyoxal and hydroxycarboxylic acids will form only in the absence of acidic catalysts at above 100° C. and therefore differ from known polyacetals formed from tartaric acid and glyoxal that are described in EP 033100 B1. The condensation is carried out with at least 1 mol of a compound of group (b) per structure (I) or (II) of compound (a). In some cases component (b) can be used in the condensation in excess. In this case it acts as a solvent and is recovered after the reaction has ended.

The acetal-lactone condensation products described hereinafter are novel substances. They are obtainable by reacting condensation products formed from (a) polybasic hydroxycarboxylic acids or polybasic secondary aminocarboxylic acids with polyhydroxy compounds and having a K value of from 8 to 100 (determined by the method of H. Fikentscher on a 1% strength aqueous solution of the sodium salt at pH 7 and 25° C.) with (b) aldehydes, ketones or aldehyde- or keto-carboxylic acids. The K-value of the acetal-lactone condensation products corresponds essentially to the K-value of the condensation products formed from polyhydroxy compounds and hydroxycarboxylic acids or secondary aminocarboxylic acids. Reacting polyvinyl citrate with glyoxylic acid as component (b) gives for example acetal-lactones of the following structure:

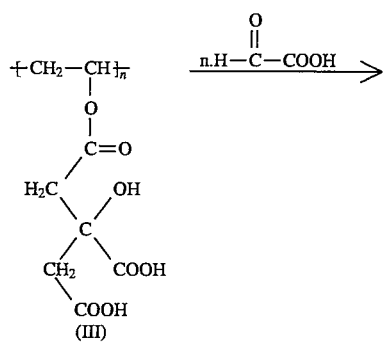

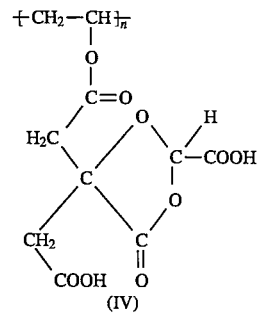

The reaction of polyesters of the formula V (formed from citric acid and glycol) with glyoxylic acid gives acetal-lactone polyesters of the formula VI:

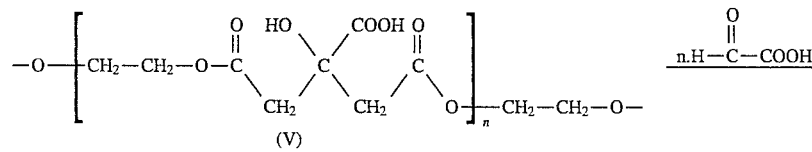

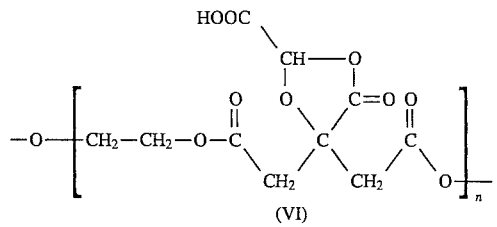

The condensation can be carried out in the melt, in which case, for example, a mixture of the hydroxycarboxylic acid with one of the abovementioned compounds of group (b) is prepared, with or without water, and de-watered at from 60° to 180° C. The condensation can be carried out under superatmospheric pressure, under atmospheric pressure or under reduced pressure. If it is carried out under atmospheric pressure, the condensation is preferably carried out in an inert gas stream. If volatile aldehydes or ketones are used, these compounds can also be used in excess, recovered and reused for the same reaction. In many cases the condensation can be carried out without the addition of catalysts. The addition of acidic esterification catalysts such as benzenesulfonic acid, sulfuric acid, phosphoric acid, p-toluenesulfonic acid or of Lewis acids such as zinc chloride can be of advantage. It is of course also possible to reverse the order of the condensation, ie. first to prepare a low molecular weight acetal-lactone from a polybasic hydroxycarboxylic acid and an aldehyde or ketone and then further reacting it with the polyhydroxy compound. Of particular suitability for this way of carrying out the reaction are the anhydrides of the acetal-lactones of citric or isocitric acid which are obtainable from the acetal-lactones that contain free carboxyl groups by elimination of water with acetic anhydride. Monitoring of the conversion is possible by determining the amount of condensate or for example by means of chromatography of samples taken from the reaction mixture. The products obtained are viscous resins or brittle glassy solids which may be converted with aqueous bases into the salts. Depending on the substitution pattern, the obtainable condensates differ in stability on dissolving in water. At a strongly acid pH the compounds are generally hydrolyzed back into the starting compounds. At an alkaline pH the cyclic acetal-lactones or N,O-acetal-lactones are partially or completely cleaved open to form the acyclic hemiacetals which differ in stability according to structure.

The condensation can also be carried out in suspension in an inert organic solvent such as benzene, toluene or xylene or paraffin hydrocarbons, in which case the water of condensation is then preferably removed azeotropically from the reaction mixture. To prevent clumping with this method it can be advantageous to carry out the reaction in the presence of a protective colloid, eg. polyvinyl ether. For use as component (a) for preparing the novel substances there may be considered the hydroxycarboxylic acids or secondary aminocarboxylic acids mentioned above under (a). Suitable polyhydroxy compounds include all of the above-described polyhydroxy compounds, preferred examples being glycol, glycerol, oligoglycerol, sorbitol, pentaerythritol, polyethylene glycols, mono-, oligo- and polysaccharides and polyvinyl alcohol.

The polysaccharides can be of vegetable or animal origin or come from the metabolism of microorganisms. These products can be used in native form or in modified form as starting materials for preparing component (a). Examples of suitable polysaccharides are starch, cellulose, pectin, algin, chitin, chitosan, dextrin, cyclodextrin, alginic acids, heparin, carragheenan, agar, gum arabic, tragacanth gum, carraja gum, ghatti gum, carob bean flour, guar gum, tara gum, inulin, xanthan, dextran, nigeran and pentosans such as xylan and araban. From an economic viewpoint the preferred starting material for preparing component (a) is native starch or a modified starch. Usable modified starches are for example thermally and/or mechanically treated starch, oxidatively, hydrolytically or enzymatically degraded starches, oxidized hydrolytically or oxidized enzymatically degraded starches and also chemically modified starches.

Any naturally occurring starch is suitable. However, preference is given to starches from corn, wheat, rice, tapioca and potatoes. The starches are virtually insoluble in water, but can be converted into a water-soluble or water-dispersible form in a conventional manner by thermal and/or mechanical treatment or by an enzymatic or an acid-catalyzed partial degradation. Starch degradation products which are obtainable by an oxidative, hydrolytic or enzymatic partial degradation of native starch are for example dextrins, such as white and yellow dextrins, and also maltodextrins and cyclodextrins. Suitable coreactants for preparing component (a) also include oxidized starches, such as dialdehyde starch and oxidized starch degradation products, preferably containing at least 20% of polysaccharides having at least five monosaccharide units in the molecule. Compounds of this type can be obtained for example by oxidation of starch with periodate, chromic acid, hydrogen peroxide, nitrogen dioxide, nitrogen tetroxide, nitric acid or hypochlorite.

To prepare component a) it is also possible to use the reaction products of hydroxycarboxylic acids or secondary aminocarboxylic acids with chemically modified polysaccharides, in particular chemically modified starches, for example starches and starch partial degradation products partially reacted with acids to give esters and with alcohols to give ethers. The esterification of these substances is possible not only with inorganic but also with monobasic organic acids, their anhydrides or chlorides. In the case of direct esterification the liberated water brings about an acid-catalyzed cleavage of glycosidic bonds. Of particular commercial interest are phosphatized and acetylated starches and starch degradation products. The most widely used method for etherifying starch is to treat the starch and the starch degradation products with organic halogen compounds, epoxides or alkyl sulfates in an aqueous alkaline solution. Starch ethers are for example mono- and dialkyl ethers, hydroxyalkyl ethers, carboxyalkyl ethers and allyl ethers of starch.

The group of chemically modified polysaccharides also includes for example acetylcellulose, carboxymethylcellulose, hydroxypropylcellulose, carboxymethylhydroxyethylcellulose, sulfoethylcellulose, carboxymethylsulfoethylcellulose, hydroxypropylsulfoethyl-cellulose, hydroxyethylsulfoethylcellulose and ethyl-sulfoethylcellulose.

Compounds of component a) are also obtainable by reacting hydroxycarboxylic acids or secondary amino-carboxylic acids with polyvinyl alcohols, specifically all water-soluble polyvinyl alcohols. In general they have viscosities of from 3 to 10,000, preferably from 10 to 5,000, mPas (determined on a 10% strength solution at 20° C. using a Höppler falling ball viscometer in accordance with DIN 53 015). The polyvinyl alcohols are customarily prepared by hydrolysis of polyvinyl acetate. They can be present in a partially or completely hydrolyzed form. For example, the degree of hydrolysis is in general from 70 to 100%, preferably from 85 to 99%. It is also possible to use oxidatively degraded polyvinyl alcohols as coreactants for preparing components of component a). Degraded polyvinyl alcohols of this type have molecular weights of from 500 to 50,000.

The coreactants preferably used for preparing compounds of component a) are the polyhydroxy compounds starch, dextrins and polyvinyl alcohols.

The acetal-lactone condensation products thus obtainable have K values of from 8 to 100 (determined by the method of H. Fikentscher on a 1% strength by weight aqueous solution of the sodium salt at pH 7 and 25° C.).

Novel acetal-lactone condensation products are also obtained by condensing a) hydroxycarboxylic acids or secondary aminocarboxylic acids or mixtures thereof with b) glyoxal or mixtures of glyoxal with other aldehydes, ketones, aldehydecarboxylic acids or ketocarboxylic acids that contain at least 10 mol % of glyoxal in the absence of acidic catalysts at above 100° C. The reaction of citric acid with glyoxal gives for example acetal-lactones of the structure VII

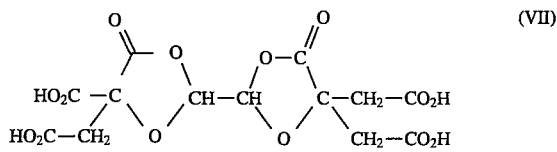

as principal component together with isomeric and higher molecular weight condensation products. From tartaric acid and glyoxal the same method produces polyacetal-lactones. The acetal-lactones are relatively hydrolysis-stable compounds and are very useful in the form of their salts as detergent and cleaner additives which act as dispersants or as incrustation inhibitors in preventing the formation of incrustations of insoluble inorganic or organic salts.

Not only the known acetal-lactones but also the above-described novel condensation products with acetal-lactone structures are cleaved according to the invention in a further reaction with the compounds of group (c) aminocarboxylic acids, primary or secondary amines and/or polyethylene-imines in an aqueous medium at an alkaline pH to give condensation products that contain N,O-acetal or carboxamide structures. For instance, the action of iminodiacetic acid on the acetal-lactone formed from citric acid and glyoxylic acid produces the amide VIII and the N,O-acetal of the formula IX:

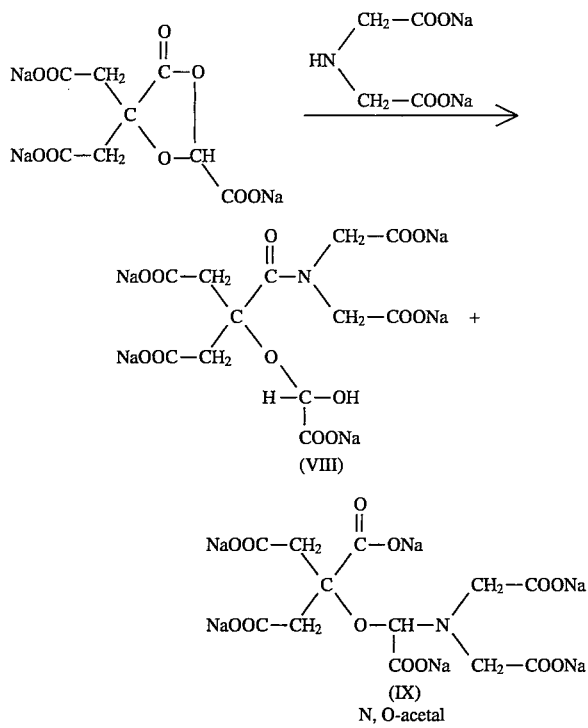

The primary amide or N,O-acetal products may in some instances undergo secondary reactions. For instance, from the amides of the structural type VIII it is possible, through elimination of the aldehyde or ketone, to obtain the amides of the parent hydroxycarboxylic acids a) with the amines c) selectively. Amides or N,O-acetals obtained with primary amines c) can also be cyclized to form the corresponding oxazolones.

Suitable compounds for use as component (c) are amino acids, for example glycine, alanins, valine, leucine, aspartic acid, glutamic acid, iminodiacetic acid, iminodipropionic acid, N-methylaspartic acid, N-methylglutamic acid, lysine and arginine. It is also possible to use for example carboxymethylethylenediamine and also primary or secondary amines, for example $C_1$–$C_{10}$-alkylamines, eg. methylamine, ethylamine, propylamine, diethylamine, dimethylamine, butylamine, dibutylamine and hexylamine, and also aminosugars, glucosamine and aminosorbitol. It is similarly possible to use diamines, such as ethylenediamine, propylenediamine and diaminobutane, and terminally aminated polyalkylene oxides and polyamines, such as diethylenetriamine, triethylenetetramine, polyethyleneimines, polyvinylamines, and vinyl-amine-containing copolymers or chitosan. Preferred compounds of group (c) are glycine, alanine, aspartic acid, glutamic acid and iminodiacetic acid.

The reaction of the acetal-lactones with the compounds of group (c) takes place in the alkaline region, preferably at a pH of from 8 to 12. In the case of the reaction with amino acids as component (c) it can be advantageous first to neutralize the amino acids and adjust them to the desired pH. The reaction is preferably carried out in aqueous solution. It can also be carried out in mixtures of water with water-miscible solvents. In those cases where the acetal-lactone and the amine of component (c) contain no free carboxyl groups, the reaction can also be carried out in anhydrous solvents. It is also possible to carry out the reaction in the absence of solvents.

The above-described condensation products with N,O-acetal or carboxamide structures are used as reduced-phosphate and phosphate-free detergent and cleaner additives. For this purpose they are preferably neutralized with alkali metal bases, ammonia or amines prior to the preparation of the detergent formulations. Suitable bases are in particular sodium hydroxide solution, potassium hydroxide solution, sodium carbonate, sodium bicarbonate, potassium carbonate, potassium bicarbonate, ammonia, ethanolamine, diethanolamine, triethanolamine, hydroxylamine, triethylamine, tributylamine and hexyl-amine. The products of the invention are used in the detergent formulation in amounts of from 0.5 to 20, preferably from 3 to 15, % by weight. They act as builders and they disperse the soil in the wash liquor and inhibit incrustation. Especially structures which have a high carboxyl group density, for example the compounds of the formulae VII, VIII and IX, act as incrustation inhibitors. Reduced-phosphate detergents for the purposes of the present invention are detergent formulations which contain not more than 25% by weight of sodium triphosphate.

The compositions of detergent and cleaner formulations can differ greatly. Detergent and cleaner formulations customarily contain from 2 to 50% by weight of surfactants with or without builders. These figures apply both to liquid and to pulverulent detergent and cleaner formulations. Examples of the compositions of detergent formulations customary in Europe, the USA and Japan are shown for example in table form in Chemical and Engn. News 67 (1989), 35. Further information about the compositions of detergents and cleaners can be found in WO-A-90/13581 and Ullmanns Encyclopädie der technischen Chemie, Verlag Chemie, Weinheim 1983, 4th Edition, pages 63–160. Also of interest are those detergent formulations which contain up to 60% by weight of an alkali metal silicate and up to 10% by weight of a polycondensate prepared according to the invention. Suitable alkali metal silicates are for example the amorphous sodium disilicates described in EP-A-0 444 415 and crystalline sheet-silicates which according to EP-A-0 337 219 are present in detergent formulations as builders and according to EP-B-0 164 514 are used for softening water, and sodium silicates which are obtainable by dewatering sodium silicate solutions and drying down to water contents of from 15 to 23, preferably from 18 to 20, % by weight.

Detergents may additionally contain a bleaching agent, for example sodium perborate, which if used can be present in the detergent formulation in amounts of up to 30% by weight. Detergents and cleaners may additionally contain further customary additives, for example complexing agents, opacifiers, optical brighteners, enzymes, perfume oils, color transfer inhibitors, grayness inhibitors and/or bleach activators.

The K values of the condensates were determined by the method of H. Fikentscher, Cellulosechemie 13 (1932), 58–64, 71–74, on a 1% strength by weight aqueous solution of the sodium salt at 25° C. and pH 7. The percentages in the examples are by weight.

The condensation products with acetal-lactone structures can be characterized by their infrared spectra; they show a characteristic vibration band at 1802–1835 cm$^{-1}$, which is shown neither by the starting materials nor by purely acetalic structures. In addition, the signals in the $^1$H-NMR and $^{13}$C-NMR spectrum are characteristic of the CH from the aldehyde or the C from the ketone. The reaction with component c) gives amides which contain the aldehyde or the ketone bonded hemiacetalical and N,O-acetals and also products formed from these intermediates by hydrolysis or cyclization. Amides and N,O-acetals generally occur together, the ratio of the products depending greatly on the cations present and on the reaction conditions. The acetal bonds in the amide or N,O-acetal are hydrolytically cleaved more or less rapidly depending on the ambient conditions. The reaction products can be characterized by commonly used analytical methods, if necessary after chromatographic sample preparation. Of particular suitability for this purpose are $^1$H-NMR, $^{13}$C-NMR and infrared spectra.

EXAMPLE 1

4.96 g citric acid and glyoxylic acid acetal-lactone described in US-A-3 763 189 (acid form) are dissolved in 15 ml of water together with 3.0 g of glycine at room temperature, and 50% strength NaOH (in water) is added with stirring at room temperature, maintained by cooling with an ice bath, in the course of 20 min until a pH of 10 is reached. The solution is maintained at room temperature for 24 hours. To isolate the solid product, the solution is freeze dried; the isolated product is pale yellow and amorphous and contains as the principal component the citramide VIII in addition to the amide of citric acid and iminodiacetic acid formed therefrom by elimination of the glyoxylate group and the N,O-acetal IX.

EXAMPLE 2

4.96 g citric acid and glyoxylic acid acetal-lactone described in U.S. Pat. No. 3,763,189 (acid form) are dissolved in 15 ml of water together with 2.93 g of iminodiacetic acid at room temperature, and 50% strength NaOH (in water) is added with stirring at room temperature, maintained by cooling with an ice bath, in the course of 20 min until a pH of 10 is reached. The solution is heated at 50° C. for 24 hours. To isolate the solid product, the solution is freeze dried; the isolated product is colorless and amorphous and contains as the principal component the citramide VIII in addition to the amide of citric acid and iminodiacetic acid formed therefrom by elimination of the glyoxylate group and the N,O-acetal IX.

EXAMPLE 3

4.96 g of the cyclic acetal-lactone formed from citric acid and glyoxylic acid are initially charged at room temperature together with 0.88 g of diaminobutane, and 50% strength NaOH (in water) is added with stirring and cooling with an ice bath until a pB of 10 is reached. The solution is maintained at room temperature for 24 h. To isolate the solid product, the solution is freeze dried; the isolated product is a colorless amorphous solid comprising a mixture of different bisaddition products of the acetal-lactone with the amino groups of the diamide. Citramide structures predominate.

EXAMPLE 4

Example 3 is repeated with 0.80 g of triethylene-tetramine instead of the diaminobutane. The product obtained is a colorless amorphous solid comprising a mixture of different bisaddition products of the acetal-lactone with the amino groups of the diamide. Citramide structures predominate.

EXAMPLE 5

Tartaric acid and glyoxylic acid are reacted as described in U.S. Pat. No. 3,989,637 to prepare a bisacetal-lactone. 10 g of the bisacetal-lactone are reacted with 11.2 g of iminodiacetic acid as in Example 2. Freeze drying yields a colorless amorphous solid comprising a mixture of different bisaddition products of the amino acid with the bisacetallactone. Citramide structures predominate.

EXAMPLE 6

Example 5 is repeated using 11.2 g of aspartic acid instead of iminodiacetic acid. The product obtained is a colorless amorphous solid comprising a mixture of different bisaddition products of the amino acid with the bisacetal-lactone. Citramide structures predominate.

EXAMPLE 7

Example 5 is repeated with 12.4 g of glutamic acid instead of the iminodiacetic acid. The product obtained is a colorless amorphous solid comprising a mixture of different bisaddition products of the amino acid with the bisacetal-lactone. Citramide structures predominate.

EXAMPLE 8

Citric acid and tartaric acid are reacted in a molar ratio of 1:1 as described in EP-A-0 483 606 to prepare a polycondensate having an average molecular weight $M_n$ of 1200 D. 100 g of this polycondensate are dissolved at room temperature in 41.1 g of 50% strength glyoxylic acid and 50 g of water and condensed at 100° C. with stirring and distillative removal of the water under reduced pressure. In the course of the condensation the pressure is reduced from 800 mbar to 20 mbar. The condensation is continued at 20 mbar for a further 8 h. The polycondensate obtained is a yellowish brittle solidifying resin. 10 g of the polyacetal-lactone are dissolved in 10 ml of water. Separately, 3.5 g of glycine are dissolved in 15 ml of water, and both these solutions are adjusted to pH 10 with NaOH. They are then combined and held at room temperature for 24 h. Freeze drying yields an amorphous yellowish solid comprising a citric acid-tartaric acid polyester with amide and N,O-acetal structures.

EXAMPLE 9

First a starch titrate with 30% esterification of the OH groups is prepared by esterifying hydroxylpropylated potato starch at 130° C. with distillative removal of water with citric acid neutralized to 17%. 5 mol of citric acid are used per mole of anhydroglucose unit. 50 g of the polyester thus obtained, in the acid form, are stirred with 200 ml of methanol at room temperature for 2 h to separate off the excess citric acid and filtered. The colorless residue is washed with methanol and dried at room temperature under reduced pressure.

10 g of the starch citrate thus obtained are dissolved in a mixture of 7.6 g of 50% strength glyoxylic acid and 10 ml of water at room temperature. The solution is then brought to the boil and the water is distilled off. In the course of the postcondensation the pressure is reduced from 800 mbar to 20 mbar. The condensation is carried out at 100° C. and 20 mbar for 8 h. The product obtained is a pale yellow moussy resin, which is cooled down and dissolved in 40 ml of water at 10° C. 3.8 g of glycine are added to the solution, followed at room temperature (maintained by cooling with an ice bath) by a sufficient amount of 50% strength sodium hydroxide solution until the reaction mixture has reached a pH of 10.5. The solution is maintained at room temperature for 24 h. To isolate the solid product the solution is freeze dried. The product obtained is colorless and amorphous and comprises a starch citrate with amide and N,O-acetal structures on the citrate substituents.

EXAMPLE 10

Sorbitol and citric acid are reacted to form the sorbitol hexacitrate described in DE-B-2 147 778. 10 g of this polycondensate are dissolved at room temperature in 11 g of 50% strength glyoxylic acid and 10 g of water and condensed at 100° C. with stirring and distillative removal of the water under reduced pressure. As the condensation proceeds the pressure is reduced from 800 mbar to 20 mbar. At 20 mbar the condensation is continued for a further 8 h. The obtainable yellowish resin is cooled down and dissolved in 40 ml of water at 10° C. 7.2 g of iminodiacetic acid are added to the solution, followed at room temperature (maintained by cooling with an ice bath) by 50% strength NaOH (in water) until a pH of 10.5 is reached. The solution is heated at 50° C. for 24 h. To isolate the solid product the solution is freeze dried. The product obtained is a pale yellow amorphous solid comprising a sorbitol citrate having amide and N,O-acetal structures on the citrate substituents.

EXAMPLE 11

The cyclic acetal-lactone of citric acid and formaldehyde is prepared as described in Chem. Zentralblatt 1902, I. 300. 4.08 g of the lactone are reacted with glycine and 6.4 g of 50% strength NaOH as in Example 1. The product obtained is a colorless amorphous solid containing as main components the citramide analogous to structure VIII and the amide formed therefrom by elimination of glyoxylate.

EXAMPLE 12

First tartaric acid and glyoxal are reacted to prepare a polycondensate containing acetal-lactone groups. To this end 150 g of tartaric acid in a 2 l round-bottomed flask are admixed with 348 g of 20% strength glyoxal solution in 5 portions; after each addition the water is distilled off under reduced pressure by raising the temperature in each case from 40° C. to 30° C. and reducing the pressure from 200 mbar to 10 mbar. After the reaction has ended, the mixture is postcondensed at 160° C./10 mbar for a further 4 h. 17 g of the brittle amorphous solid product are dissolved in water at 10° C. together with 7.5 g of glycine at pH 10, set with 10% strength NaOH, and the solution is maintained at room temperature for 24 h. To isolate the solid product the solution is freeze-dried; the product obtained is a pale yellow amorphous solid comprising oligomeric N,O-acetals and hemiacetals with carboxamide structures and also tartaramides with glycine obtained therefrom by partial hydrolysis.

EXAMPLE 13

Example 12 is repeated with 210 g of citric acid monohydrate and 348 g of 20% strength glyoxal to prepare a condensation product with acetal-lactone groups by postcondensation at 130° C./10 mbar for 2 h. 22.1 g of the brittle amorphous solid product are suspended in water at 10° C. together with 13.3 g of iminodiacetic acid at pH 10 (set with 10% strength NaOH) and the solution is maintained at 50° C. for 12 h. To isolate the solid product the solution is freeze dried; the isolated product is a colorless amorphous solid comprising di- and oligomeric N,O-acetals and carboxamido-containing hemiacetals and also the citramide with iminodiacetic acid obtained therefrom by partial hydrolysis.

USE EXAMPLES

Clay dispersion

The removal of particulate soil from fabric surfaces is augmented by the addition of polyelectrolytes. The stabilization of the dispersion formed on detachment of the particles from the fabric surface is an important function of these polyelectrolytes. The stabilizing effect of the anionic dispersants is due to the fact that, as a consequence of adsorption of dispersant molecules on the surfaces of the solid particles, the charge thereon is increased, which increases the repulsion. Further factors influencing the stability of a dispersion include steric effects, the temperature, the pH and the electrolyte concentration.

The clay dispersion (CD) test described hereinafter is a simple way of assessing the dispersing power of different polyelectrolytes.

CD Test

Particulate soil is modeled by finely ground China clay SPS 151. 1 g of the clay is intensively dispersed in 98 ml of water in a 100 ml cylinder in the presence of 1 ml of a 0.1% strength sodium salt solution of the polyelectrolyte for 10 minutes. Immediately on ceasing the stirring a sample of 2.5 ml is removed from the center of the cylinder and diluted to 25 ml and measured in a turbidimeter. After the dispersion has stood for 30 and 60 minutes, further samples are taken and again measured in the turbidimeter. The turbidity of the dispersion is reported in nephelometric turbidity units) (NTUs). The less the dispersion settles on storage, the higher the measured turbidity values and the stabler the dispersion is. The second physical parameter determined is the dispersion constant τ, which describes the time course of the sedimentation process. Since the sedimentation process approximates to a monoexponential time law, τ indicates the time within which the turbidity decreases to 1/e-th of the original level at time t=0.

| Example No. | Condensate of Example | Turbidity after storage [NTU] at once | 30 min | 60 min | Dispersion constant τ [min] |
|---|---|---|---|---|---|
| 14 | 1 | 760 | 620 | 600 | 501 |
| 15 | 2 | 700 | 550 | 430 | 123 |
| 16 | 5 | 720 | 530 | 460 | 148 |
| 17 | 10 | 750 | 580 | 500 | 155 |
| 18 | 13 | 750 | 590 | 500 | 150 |
| Comp. Ex. 1 | — | 600 | 37 | 33 | 41 |

Calcium carbonate dispersion

The calcium carbonate dispersing power was determined by dissolving 1 g of the condensate in 100 ml of distilled water, neutralizing if necessary with 1 M sodium hydroxide solution and adding 10 ml of 10% strength sodium carbonate solution. The solution was then titrated at constant pH and constant temperature with 0.25 M calcium acetate solution to cloudiness. The pH was set by adding either dilute sodium hydroxide solution or hydrochloric acid solution. The dispersing power was determined at 20° C. and pH 11.

| Example No. | Condensate of Example | Dispersing power [mg of CaCO$_3$/g of condensate] |
|---|---|---|
| 19 | 2 | 95 |
| 20 | 7 | 90 |
| 21 | 10 | 80 |
| 25 | 13 | 75 |
| Comp. Ex. 2 | citric acid, sodium salt | 55 |

We claim:

1. A condensation product that contains an N,O-acetal or carboxamide structure, obtained by condensation of (a) a compound that contains at least one unit of the structural element

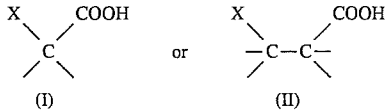

wherein X is OH or NHR, where R is $C_{1-6}$ alkyl or —(CH$_2$)$_n$—COOH wherein n is an integer of 1–4; with (b) an aldehyde, ketone, aldehyde-carboxylic acid or keto-carboxylic acid to form an acetal-lactone; and subsequent cleavage of said acetal-lactone with (c) an amine selected from the group consisting of an aminocarboxylic acid, a primary amine, a secondary amine, a polyethyleneimine and a mixture thereof.

2. The condensation product of claim 1, wherein compound (a) is selected from the group consisting of a hydroxycarboxylic acid, a secondary amino acid, a poly-α-hydroxyacrylic acid, a poly-α-hydroxymaleic acid, a copolymer obtained by hydrolysis of a copolymer of a vinyl ester and monoethylenically unsaturated mono- or dicarboxylic acids or an esterification product of a polybasic hydroxycaboxylic acid with a polyhydroxy compound.

3. A reduced-phosphate or phosphate free detergent composition comprising:

i) a surfactant; and ii) the condensation product of claim 1.

4. A process for preparing a condensation product that contains an N,O-acetal or carboxamide structure, which comprises reacting (a) a compound that contains at least one unit of the structural element

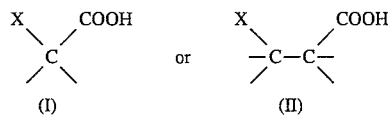

wherein X is OH or NHR, where R is $C_{1-6}$ alkyl or —(CH$_2$)$_n$—COOH wherein n is an integer of 1–4; with (b) an aldehyde, ketone, aldehyde-carboxylic acid or keto-carboxylic acid to form an acetal-lactone; and subsequent cleavage of said acetal-lactone with (c) an amine selected from the group consisting of an aminocarboxylic acid, a primary amine, a secondary amine, a polyethyleneimine and a mixture thereof.

5. The process of claim 4, wherein compound (a) is selected from the group consisting of a hydroxycarboxylic acid, a secondary amino acid, a poly-α-hydroxyacrylic acid, a poly-α-hydroxymaleic acid, a copolymer obtained by hydrolysis of a copolymer of a vinyl ester and monoethylenically unsaturated mono- or dicarboxylic acids or an esterification product of a polybasic hydroxycaboxylic acid with a polyhydroxy compound.

6. Condensation products that contain acetal-lactone structures, obtained by condensation of (a) hydroxycarboxylic acids or secondary aminocarboxylic acids with polyhydroxy compounds to give condensation products having a K value of from 8 to 100 (determined by the method of H. Fikentscher on a 1% strength by weight aqueous solution of the sodium salt at pH 7 and 25° C.) and reaction of the condensation products with (b) aldehydes, ketones or aldehyde- or keto-carboxylic acids.

7. Condensation products that contain acetal-lactone structures, obtained by condensation of a) hydroxycarboxylic acids or secondary aminocarboxylic acids, with b) glyoxal.

* * * * *

UNITED STATES PATENT AND TRADEMARK OFFICE
CERTIFICATE OF CORRECTION

PATENT NO. : 5,488,095
DATED : Jan. 30, 1996
INVENTOR(S) : Dieter BOECKH, et al.

It is certified that error appears in the above-indentified patent and that said Letters Patent is hereby corrected as shown below:

On the title page, Items [22], [86], and [87] are missing. They should read:

--[22] PCT Filed: July 8, 1993

[86] PCT #: PCT/EP93/01784
     §371 Date: Jan. 18, 1995
     §102 Date: Jan. 18, 1995

[87] PCT Pub. No.: WO94/02582
     PCT Pub. Date: Feb. 3, 1994--

Signed and Sealed this

Twenty-third Day of April, 1996

Attest:

BRUCE LEHMAN

Attesting Officer

Commissioner of Patents and Trademarks